May 22, 1923.
M. W. CHIPMAN
CLUTCH
Filed Aug. 10, 1921
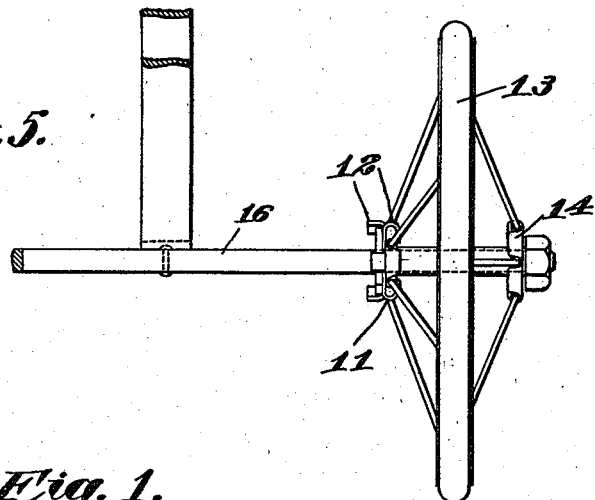
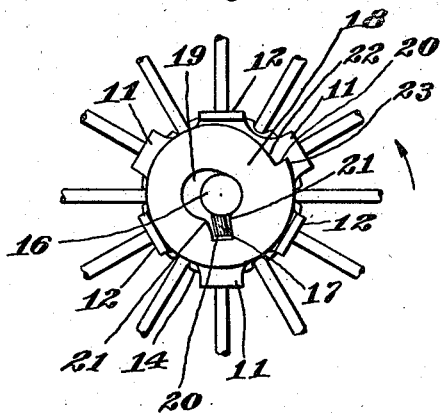
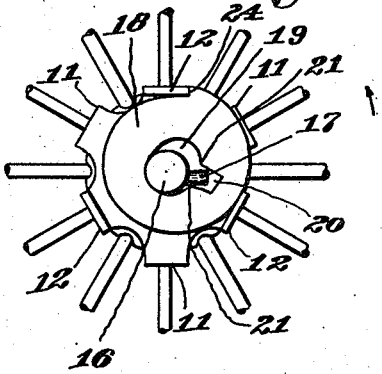
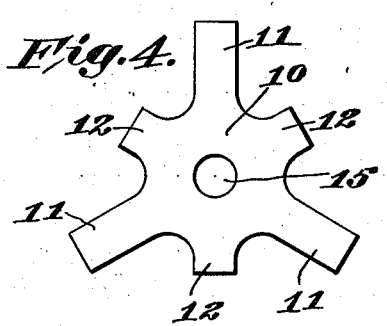
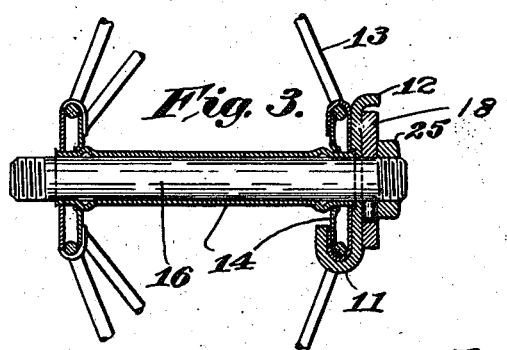

Patented May 22, 1923.

1,455,901

UNITED STATES PATENT OFFICE.

MARK W. CHIPMAN, OF LYNN, MASSACHUSETTS, ASSIGNOR TO LYNN MACHINE SCREW COMPANY, OF LYNN, MASSACHUSETTS, A CORPORATION OF MASSACHUSETTS.

CLUTCH.

Application filed August 10, 1921. Serial No. 491,264.

*To all whom it may concern:*

Be it known that I, MARK W. CHIPMAN, a citizen of the United States, and resident of Lynn, in the county of Essex and State of Massachusetts, have invented an Improvement in Clutches, of which the following description, in connection with the accompanying drawings, is a specification, like letters on the drawings representing like parts.

My present invention relates to clutch mechanisms, and more particularly to clutch mechanisms for positively connecting a driving and a driven member together when the driving member is rotated in one direction, and for allowing free rotary movement of the driven member when the driving member is held stationary, or rotated at a speed less than the speed of rotation of the driven member.

In vehicles, such as coasting vehicles for children, or in lawn mowers, it has been difficult to devise a clutch mechanism that is both efficient in operation and simple and economical to manufacture. In light vehicles, such as the above, where the question of cost of manufacture is of vital importance, a complicated clutch mechanism, expensive to manufacture, and which has heretofore been necessary, has precluded the introduction of this type of clutch. In children's coasters in particular, where the wheels are light wire wheels, it has been heretofore practically impossible to design a clutch mechanism that could be attached thereto.

I have overcome the objections noted above with regard to prior structures and have designed the clutch mechanism forming the subject-matter of the present invention, wherein a positively acting clutching action between the driving and driven members is obtained, and a free coasting operation of the driven member is also obtained when the driving member is held stationary or rotated at a less speed than the speed of the driven member. Also, in prior structures, wherein it was attempted to connect a driving and a driven member together by means of an outwardly moving cam, the construction of the connecting means was such as to actually prevent the desired movement of the cam. I have also remedied this defect in prior structures, and have so devised the connecting means between the driving and driven members as to facilitate the outward movement of the driving cam into the path of movement of the driven member.

The object of my invention therefore, is an improved clutch mechanism for positively connecting a driving and a driven member together when the driving and driven members are rotated in the same direction, and for positively disconnecting such driving and driven members when the driving member is held stationary or rotated in the same direction but at a less speed than the driven member.

In the accompanying drawings illustrating the preferred embodiment of my invention, Fig. 1 is an elevation of a portion of a wheel or driven member, with the clutch mechanism in position to allow free rotary movement thereof with respect to the driving member;

Fig. 2 is a view, similar to Fig. 1, but with the clutch mechanism in position to drive the driven member;

Fig. 3 is a vertical sectional view of Fig. 1;

Fig. 4 is a development of the blank of sheet metal showing the portion of the clutch mechanism attached to the driven member, and Fig. 5 is an end elevation of a wheel and axle to which my invention has been applied.

Referring to the drawings, 10 designates a blank having a plurality of relatively long arms 11 symmetrically arranged thereon and a plurality of relatively short arms 12 arranged between the arms 11, as shown in Fig. 4. Assuming that it is desired to attach my improved clutch mechanism to a light wire spoked wheel 13, the relatively long arms 11 are bent or folded over the hub flange 14 of said wheel, while the relatively short arms 12 are bent outwardly at right angles to the body of the blank 10, as shown in Figs. 1, 2 and 3. A centrally located hole 15 in the blank 10 is in alinement with the shaft 16 passing through the hub of the wheel 13.

Attached to the end of the shaft 16, adjacent to the flange 14 to which the blank 10 has been attached, is a pin 17 which, it will be noted, lies in a line parallel to a diameter, but does not pass through such diameter. Loosely mounted on the shaft 16 and on the outer face of the blank 10, is a cam plate 18 provided with an elongated or practically oval shaped slot 19, on one of the longest sides of which is formed a slot 20. The width of this slot 20 is slightly greater than the diameter of the pin 17 and the meeting faces of such slots 19 and 20 are rounded, as shown at 21. Such rounded faces assist the pin 17 in forcing the cam plate 18 into the driving or operative position shown in Fig. 2. The outer edge of the cam plate 18 is on a curve that gradually rises from the point 22 to the point 23, the difference in the rise resulting in the formation of a driving face or edge 24 which contacts with the arms 12 to drive the wheel 13, the position of this face 24 with relation to the slots 19 and 20 being such that with the parts in the position shown in Fig. 2, the face 24 is in its outward position, while in the position shown in Fig. 1, such face 24 is in its innermost position. A nut 25 holds the cam plate 18 in operative position with relation to the blank 10.

If the shaft 16 is held stationary and the wheel 13 rotated in the direction of the arrow shown in Fig. 1, the arm 12, engaging with the periphery of the cam plate 18 forces said plate into the position shown in Fig. 1 and the wheel 13 is free to rotate. If however, the shaft 16 were rotated by any suitable means in the direction of the arrows shown in Figs. 1 and 2, the pin 17 would move the cam plate 18 into the position shown in Fig. 2, where the face 24 would engage one or the other of the arms 12 to drive the wheel 13. It is obvious therefore, that my improved device is a positively operating clutch mechanism that allows free rotative movement of the driven member when the driving member is held stationary, or when the driven member rotates faster than the driving member, as it would do if the device were attached to a coasting vehicle.

While I have described the preferred embodiment of my invention somewhat in detail, it is to be understood that I may vary the size, shape and arrangement of parts constituting my invention within wide limits without departing from the spirit of the invention.

Having thus described my invention, what I claim as new, is:—

1. An improved clutch comprising, a driving member, a driving cam, an elongated slot in said cam, a second slot connecting with said elongated slot, a driving pin on said driving member extending into said second slot, and a driven member having a plurality of outwardly extending arms engaging said cam to force the cam inwardly and allow free rotative movement of the driven with respect to the driving member.

2. An improved clutch comprising, a driving member, a driving cam, an elongated slot in said cam, a second slot connecting with said elongated slot, a driving pin on said driving member extending into said second slot on a line parallel to a diameter of said driving member and operating to force said cam outwardly when the driving member is rotated, and a driven member having a plurality of outwardly extending arms adapted to be engaged by said cam to positively drive the driven member.

3. An improved clutch comprising, a driving member, a driving cam, an elongated slot in said cam, a second slot connecting with said elongated slot, the connecting faces of said slots being rounded, a driving pin on said driving member extending into said second slot, on a line parallel to a diameter of said driving member and operating to force said cam outwardly when the driving member is rotated, and a driven member having a plurality of outwardly extending arms adapted to be engaged by said cam to positively drive the driven member.

In testimony whereof, I have signed my name to this specification.

MARK W. CHIPMAN.